(12) United States Patent
Mein et al.

(10) Patent No.: US 7,146,618 B1
(45) Date of Patent: *Dec. 5, 2006

(54) SIMPLE OBJECT ACCESS PROTOCOL

(75) Inventors: Gunnar Mein, Issaquah, WA (US); Shankar Pal, Redmond, WA (US); Govinda Dhondu, Bellevue, WA (US); Thulusalamatom Krishnamurthi Anand, Bellevue, WA (US); Alexander Stojanovic, Bellevue, WA (US); Mohsen Al-Ghosein, Issaquah, WA (US); Paul M. Oeuvray, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 297 days.

This patent is subject to a terminal disclaimer.

(21) Appl. No.: 10/349,536

(22) Filed: Jan. 21, 2003

Related U.S. Application Data

(60) Continuation of application No. 09/741,586, filed on Dec. 15, 2000, now Pat. No. 6,782,542, which is a division of application No. 08/967,082, filed on Nov. 10, 1997, now Pat. No. 6,457,066.

(51) Int. Cl.
*G06F 9/44* (2006.01)
*G06F 15/16* (2006.01)
(52) U.S. Cl. ..................... 719/330; 709/236
(58) Field of Classification Search ............... 719/330, 719/310
See application file for complete search history.

(56) References Cited

U.S. PATENT DOCUMENTS

| 5,491,800 | A | 2/1996 | Goldsmith et al. |
| 5,548,723 | A | 8/1996 | Pettus |
| 5,931,917 | A | 8/1999 | Nguyen et al. |
| 5,938,733 | A | 8/1999 | Heimsoth et al. |
| 5,956,483 | A | 9/1999 | Grate et al. |
| 5,956,509 | A | 9/1999 | Kevner |
| 5,987,504 | A | 11/1999 | Toga |
| 5,991,802 | A | 11/1999 | Allard et al. |
| 6,052,710 | A | 4/2000 | Saliba et al. |
| 6,125,352 | A | 9/2000 | Frankline et al. |
| 6,169,992 | B1 * | 1/2001 | Beall et al. ............. 707/103 R |
| 6,370,561 | B1 | 4/2002 | Allard et al. |
| 6,433,795 | B1 | 8/2002 | MacNaughton et al. |

OTHER PUBLICATIONS

Bertrand-Meyer, "Object-oriented Software Construction," Prentice Hall International Series in Computer Science. 1988. pp. 172-173.*
SUN Microsystems. "Java Remote Method Invocation Specification" Feb. 10, 1997.*

(Continued)

*Primary Examiner*—Lewis A. Bullock, Jr.
(74) *Attorney, Agent, or Firm*—Christensen O'Connor Johnson Kindness PLLC

(57) ABSTRACT

An application layer protocol is provided on top of HTTP 1.0/1.1 to allow for COM Automation objects to be invoked over the Internet through IIS/ISAPI servers. The format essentially encodes the automation object's name, method to invoke, and any [in], [out], [in, out] parameters that the method signature requires, packages them up into a custom MIME type and marshals it to the ISAPI dynamic link library (DLL) on the IIS/HTTP server. There, the ISAPI DLL contains the logic to unpack the SOAP request, parses it, creates the Automation object, invokes the method with the marshaled parameters, and then returns any [out] parameters to the caller/client using the SOAP protocol. It is a stateless protocol, meaning that object lifetimes only extend to one method, and are recreated between multiple calls to the object.

3 Claims, 6 Drawing Sheets

OTHER PUBLICATIONS

Bertrand-Meyer. "Object-oriented Software Construction." Prentice-Hall International Series in Computer Science. 1988, p. 71,74-77 and 79-81.*

Arjomandi, Eshrat et al. "Smart Messages: An Object-oriented Commmunication Mechanism." USENIX. Jun. 1996.*

Jaworski, Jamie. "JAVA Developer's Guide." Sams Publishing. 1996, p. 202.*

"Basic HTTP as Defined in 1992," *W3C 1992*, Internet Engineering Task Force (IETF), May 3, 1994, <http://www.w3.org/Protocols/HTTP/HTTP2.html> [retrieved Jan. 25, 2001], 11 pp.

Berners-Lee, T., et al., "Hypertext Transfer Protocol—HTTP/1.0," May 1996, <http://www.google.com/search?q=cac . . . rfc1945.html+%22mime+http%22&hl=en> [retrieved Jun. 29, 2001], 35 pp.

Borenstein, N., and N. Freed, "MIME (Multipurpose Internet Mail Extensions) Part One: Mechanisms for Specifying and Describing the Formation of Internet Message Bodies," Sep. 1993, <http://www.faqs.org/rfcs/rfc1521.html> [retrieved Jun. 29, 2001], 57 pp.

"The Component Object Model: Technical Overview," *Microsoft.com*, 1996, <http://microsoft.com/oledev/Com_modl.htm> [retrieved Oct. 6, 1997] 19 pp.

"Distributed Component Object Model (DCOM) Binary Protocol," *Microsoft.com*, May 1996, <http://microsoft.com/workshop/prog/com/dcom.htm> [retrieved Oct. 6, 1997], 1 p.

Eastlake, D.E., 3rd, et al., "CyberCash Credit Report Card Protocol Version 0.8," <http:www.isi.edu/in-notes/rfc1898.txt> [retrieved Jan. 25, 2001], 45 pp.

Hallam-Baker, P., et al., "HTTP Authentication: Basic and Digest Access Authentication," Nov. 21, 1997.

*Java™ Remote Method Invocation Specification*, Sun Microsystems, Inc., Mountain View, Calif., Feb. 10, 1997.

Kirtland, M., "Writing a Smart Server Application With Denali," *Microsoft Interactive Developer*, Dec. 1996, <http://microsoft.com/mind/1296/denali.htm> [retrieved Apr. 26, 2001], 13 pp.

"Microsoft Windows NT Server: Server Operating System," *White Paper: DCOM Technical Overview*, Microsoft Corporation, Redmond, Wash., 1996.

Pleas, K., "ActiveX Goes Server-Side," *Microsoft Interactive Developer*, Sep. 1996, <http://microsoft.com/mind/0796/preview0796.htm> [retrieved Apr. 26, 2001], 4 pp.

Redmond, F., III, "Making Sure Your Server's Secure," *Microsoft Interactive Developer*, Nov. 1996, <http://microsoft.com/library/periodic/period96/IISSecurity.htm> [retrieved Apr. 26, 2001], 10 pp.

Rooney, P., "Microsoft Puts Toe in Warehousing Waters," *PCWeek Online ZDNet's IT Resource*, Oct. 1996, <http://www.zdnet.com/eweek/news/0805/05data.html> [retrieved Apr. 26, 2001], 3 pp.

van Hoff, A., et al., "the HTTP Distribution and Replication Protocol," Aug. 25, 1997.

* cited by examiner

SIMPLE OBJECT ACCESS PROTOCOL

CROSS-REFERENCE TO RELATED APPLICATIONS

This application is a continuation of prior application Ser. No. 09/741,586, filed Dec. 15, 2000, now U.S. Pat. No. 6,782,542, which is a divisional of prior application Ser. No. 08/967,082, filed Nov. 10, 1997, now U.S. Pat. No. 6,457,066 B1, priority from the filing dates of which are hereby claimed under 35 U.S.C. § 120.

FIELD OF THE INVENTION

The present invention relates to the field of Internet interactivity and, more particularly, to a system for accessing and invoking automation objects over the Internet.

BACKGROUND OF THE INVENTION

In the early days of desktop computing, all applications were monolithic, i.e., they were self-contained, standalone programs. As good as these programs were, a problem still existed with these monolithic applications. Development of traditional software applications required the application executables to be compiled and linked with their dependencies. Thus, every time developers wanted to update the processing logic or implement new capabilities, they would have to modify and recompile the entire primary application in order to do so. In essence, in order to make any changes to any portion of the program, the entire application had to be rewritten. This made it impractical to upgrade the application as minor improvements were made.

This problem was addressed by the introduction of a component software paradigm. A basic principle of component software is that applications can be built from a series of prebuilt and easily developed, understood, and changed software modules called components, each providing a particular function. Thus, applications could be delivered, enhanced, or extended much more quickly and at a lower cost simply by updating or adding new components.

Unfortunately, the component software paradigm suffers a problem similar to that of the monolithic application. Each time the components are enhanced and upgraded, as with applications, the components must be recompiled by the component developers. Either the application developer or the end user would have to monitor for and obtain updated components. The distributed component paradigm has provided a solution to this problem.

Distributed components exist at specific locations. Developers of applications or other components that require a distributed component need only find the component and then use it. The developer does not need to compile or recompile the component. This is done by the creators of the component. Thus, the latest and greatest version of each component is always available to developers and other users.

The widespread use of the Internet, an open environment, presents many new opportunities for distributed component software, and some associated shortcomings as well. The availability of a vast number of vendors, each creating a number of components increases the ease with which applications may be built and increases the flexibility to tailor an application to suits a user's needs. Unfortunately, the open environment of the Internet means that no one can implicitly "trust" everyone else, as is the case with a traditional client-server system. Thus, all but some dedicated server machines are hidden behind firewalls to protect against unwanted intrusions. Firewalls are barriers that filter packets based on certain criteria, such as a type of packet, and/or based on an Internet address. Firewalls shield servers by controlling traffic between the Internet and the server and controlling which packets may pass through them.

Since only certain types of packets may pass through to the server when firewalls are in place, the ability to access remote components over the Internet is severely limited.

A second problem with today's Internet is not so much a problem as a shortcoming. Much of the Internet's use is conducted through the World Wide Web, hereinafter referred to as "WWW," or simply the "Web," in which linked pages of static content, composed of a variety of media, such as text, images, audio, and video, are described using hypertext markup language (HTML). While the WWW revolution opened the doors to a wealth of information at the fingertips of ordinary people, and while HTML is a very good way of describing static documents, it provides no means to interact with the Web pages. In this static model, a Web browser uses the Hypertext Transport Protocol (HTTP) to request an HTML file from a Web server. HTTP is an Internet protocol designed for rapid and efficient delivery of HTML documents. HTTP is a stateless protocol, meaning that each request to the Web server is treated independently, with the server retaining no "memory" of any previous connections. The Web server receives the request and sends the HTML page to the Web browser, which formats and displays the page. Although this model provides a client with ready access to nicely formatted pages of information, it provides only limited interaction between the client and the Web server. Furthermore, HTML pages must be manually edited in order to change what the Web server sends to a client, such as a Web browser. Thus, much of the potential richness of the World Wide Web is not fully realized.

One of the biggest challenges to any Web site is to offer dynamic content, i.e., content that changes in realtime. This requires applications to be run from the Web servers. Changing from a static web content to a dynamic web content model would allow WWW content providers to provide interactive business applications rather than merely publishing pages of static information. For example, a travel agency could enable customers to check available flights, compare fares, and reserve seats on flights, rather than merely looking at flight schedules.

HTTP is not well-suited for implementing dynamic Web pages because interacting with Web pages potentially involves a large number of requests. In a typical scenario, a client, such as a web browser, is used to initiate a query, which is sent to an HTTP server operating on a host computer somewhere on the Internet. The query might represent a request for documents containing certain data, or may represent the address, or Uniform Resource Locator (URL), of a particular Web page. The server locates the documents and sends their contents back to the client. In loading the documents for viewing, the client often encounters additional files such as embedded images or sounds, that need to be loaded. The client continues making requests to the server until all of the additional files are received and loaded.

Since HTTP is a stateless protocol, as mentioned above, existing HTTP servers create a separate process for each request received. The greater the number of concurrent requests, the greater the number of concurrent processes created by the server. Unfortunately, creating a process for every request is time-consuming and requires large amounts of server resources such as memory and processor cycles. In addition, creating a process for every request can restrict the server resources available for sharing, slowing down performance, and increasing wait times.

In summary, since most servers are protected by firewalls, only certain types of packets, such as HTTP packets, may pass through to the server, and since HTTP is not suited for interactivity, the goal of providing dynamic content over the Internet is severely limited. Thus, in order to fully realize the potential of distributed component software and of dynamic content on the World Wide Web, there exists a need for software having the ability to access and invoke Automation objects through firewalls.

SUMMARY OF THE INVENTION

In accordance with the present invention, a method and software program that provides end users and developers with all the advantages of distributed component software, and capitalizes on the resources available on a computer network such as the Internet, to provide a richer, more interactive content is provided. The invention achieves this result by defining a protocol capable of accessing and invoking methods in Automation objects across the Internet and through firewalls. The protocol, called a Simple Object Access Protocol (SOAP), is an application layer protocol that is layered on top of HTTP and allows Microsoft Component Object Model (COM) Automation objects to be accessed and methods to be invoked over the Internet through Web servers protected by firewalls. "Application layer" refers to the highest layer in the seven-layer Reference Model for Open Systems Interconnection (OSI Reference Model), an international standard for networking by the International Standards Organization (ISO). The application layer is concerned with the semantics of the information exchanged; it ensures that two application processes performing an information processing task on either side of a network understand each other. The OSI Reference Model, as described in "Open Systems Interconnection (OSI)—New International Standards Architecture and Protocols for Distributed Information Systems," special issue, *Proc. IEEE*, vol. 71, no. 12, December 1983, is hereby incorporated by reference.

The inventive protocol includes a data structure which encodes, as a SOAP request, the name of the Automation object of interest, a method to invoke in that object, and any valid Automation [in][out] parameters to be exchanged with the object, and creates a client-side SOAP proxy for the Automation object. The range of valid parameter types is defined by the COM Automation Variant type. In addition to Variant data types, the protocol also supports passing ActiveX Data Object Recordset objects (ADO). Variant and Automation "object" classes such as the ADO Recordset may be used as either [in], [out], or [in, out] parameters. The SOAP proxy packages the SOAP request into a multipart MIME type.

MIME, which stands for Multipurpose Internet Mail Extensions, is an extension to the traditional Internet Mail protocol to allow for multimedia electronic mail. MIME was developed to accommodate electronic mail messages containing many parts of various types such as text, images, video, and audio. MIME is defined in Document RFC 1521 of the Network Working Group, September 1993, which is hereby incorporated by reference.

The SOAP proxy marshals and transfers the multipart MIME-encoded SOAP request to an Applications Programming Interface (API) which acts as a server-side SOAP stub for processing SOAP messages. Marshaling is the process of packaging up the data so that when it is sent from one process to another, the receiving process can decipher the data. The SOAP stub, which is running on the Web server, unpacks and parses the SOAP request, instantiates the COM Automation object, and invokes the method with the marshaled [in] parameters. The SOAP stub also returns any [out], or [in, out], or return, parameters from the COM Automation object instance to the SOAP proxy, and the Automation object instance is reclaimed. Thus, SOAP is a stateless protocol, i.e., one where object lifetimes only extend to one method call, and which are recreated for each call to the object.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
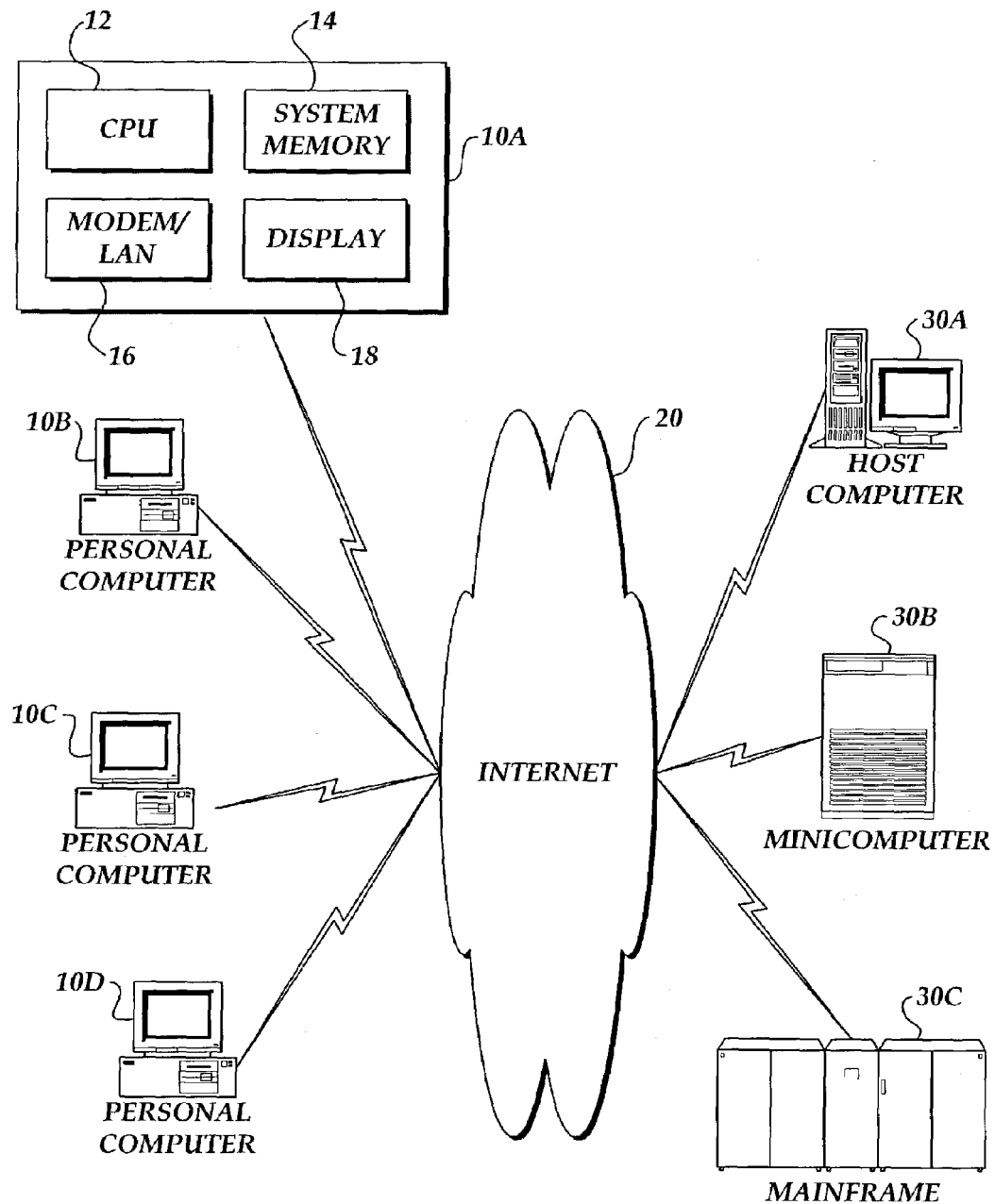
FIG. 1 depicts an environment in which the present invention operates.

As will be better understood from the following description, with reference to FIG. 1, the present invention is directed to a system for allowing a client process on a local client computer 10a, 10b, 10c, 10d, . . . to access and invoke Automation objects located on remote ISAPI-enabled Web servers 30a, 30b, 30c, . . . through a computer network such as the Internet 20.

The remote servers 30 may take the form of a host computer 30a, a minicomputer 30b, a mainframe computer 30c, or any other configuration of computer. A typical client computer 10a for implementing the invention is a general purpose computing device such as a conventional personal computer, which comprises such well-known items as a central processing unit 12, system memory 14, a modem and/or network card 16 for connecting the local computer to the Internet 20, a display 18, and other components not specifically shown in FIG. 1, such as a keyboard, mouse, etc. While the remote servers 30 will typically be university or corporate mainframe computers 30c, as noted above, they also may take the form of host personal computers 30a or dedicated workstations such as minicomputers 30b. Since all client computers will have the same properties, and since all server computers will have, in general, the same properties, for simplicity of illustration and description, the following description will describe the interaction between a client computer 10 and a server computer 30. As will be better understood from the following description, the present invention implements a protocol called the Simple Object Access Protocol (SOAP) as computer programs executing on the client computer 10 and on the server computer 30.

In a present embodiment, Automation objects are implemented as COM automation objects. COM is the Component Object Model, by Microsoft Corporation of Redmond, Wash., is an implementation of component software technology, i.e., the idea of breaking large, complex software applications into a series of pre-built and easily developed, understood, and changed software modules called components. COM is described in Dale Rogerson, *Inside COM*, Microsoft Press, 1997, which is hereby incorporated by reference.

Figure 2:
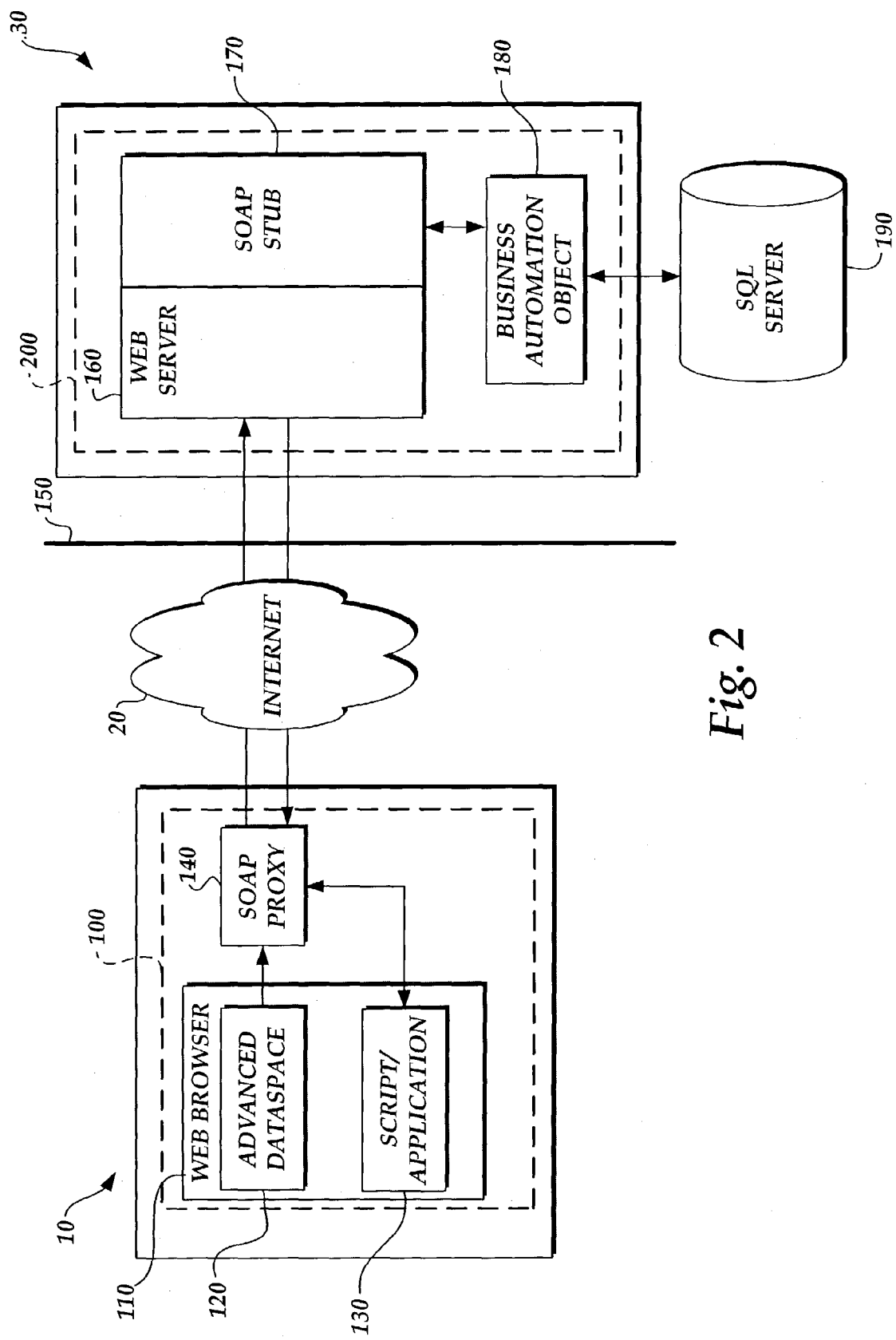
FIG. 2 is a block diagram of an embodiment of the present invention.

As shown in FIG. 2, running on the client computer 10 is a client process 110, such as a Web browser. Running on the server computer 30 is a corresponding process, such as a Web server 160. Embedded in the client process 110 is a script or application 130. The client process 110 has a run-time environment 100 that, in addition to the Web browser 110 also includes a SOAP proxy 140 whose nature is described below. The server computer 30 is protected by a firewall 150. Running on the server computer behind the firewall is the Web server 160, a SOAP stub 170 and an instance of an Automation object 180. The SOAP stub cooperates with SOAP proxy in the manner described below. Connected to, and in communication with, the server computer 30 is a database 190, which may located in the server computer 30 itself, or located remotely on a database server (not shown). As described above in connection with FIG. 1, the client computer 10 and server computer 30 are connected to, and in communication with, each other through a network such as the Internet 20.

SOAP is a data transmission paradigm. The data transmission paradigm includes a three-section data structure that comprises a header, body, and trailer. The data structure is used to package information referring to a request to invoke a method of an Automation object. In operation, when the client process 110 requires certain data from an Automation object, the process issues a method call, which causes an Advanced DataSpace 120 to be created. The Advanced DataSpace 120, in turn, creates a SOAP proxy 140 for the Automation object 180. The SOAP proxy 180 packages the data structure as an HTTP POST message in multipart MIME packets, and sends the message as a binary data stream through the network, i.e., the Internet 20, to the server computer 30 where the Automation object 180 is located.

When the server computer 30 receives the HTTP POST message, the server process 160, i.e., the Web server 160, invokes a SOAP stub 170 for the SOAP proxy 140. The SOAP stub that is invoked is chosen based on an identifier contained in the header of the data structure. The SOAP stub 170 unpackages the multipart MIME packets and instantiates the Automation object 180 identified in the header of the data structure. A method name field also identified in the header of the data structure indicates the method of the Automation object 180 to invoke. The method is invoked by the SOAP stub 170 using [in] parameters contained in the body of the data structure.

After the method has finished executing, return, or [out], parameters are returned to the SOAP stub 170, which packages the [out] parameters as multipart MIME packets and transmits a resulting HTTP Response message as a binary data stream across the Internet 20 to the SOAP proxy 170. The SOAP proxy 170 unpackages the multipart MIME packets and returns the [out] and [in, out] parameters to the client process 100. The instance of the Automation object 180 is reclaimed after the [out] parameters are returned to the SOAP stub 170. The [out] parameters, like the [in] parameters, are contained in the body of the data structure.

As noted above and illustrated in FIG. 2, the client process 110 contains a script or application 130 for performing a particular function. The script or application may be implemented by such means as components developed according to the ActiveX specification by Microsoft Corporation of Redmond, Wash., or as an embedded script written in a language such as JScript by Microsoft Corporation of Redmond, Wash. Those skilled in the art will readily recognize alternative methods and means for implementing the script or application, and will appreciate that they may be employed without departing from the spirit or scope of the present invention. The client process 110 may be a Web browser, an example of which is the Internet Explorer, from Microsoft Corporation, of Redmond, Wash., or may be any distributed component software application requiring one or more components from one or more vendor sites located on the Internet.

Figure 3A:
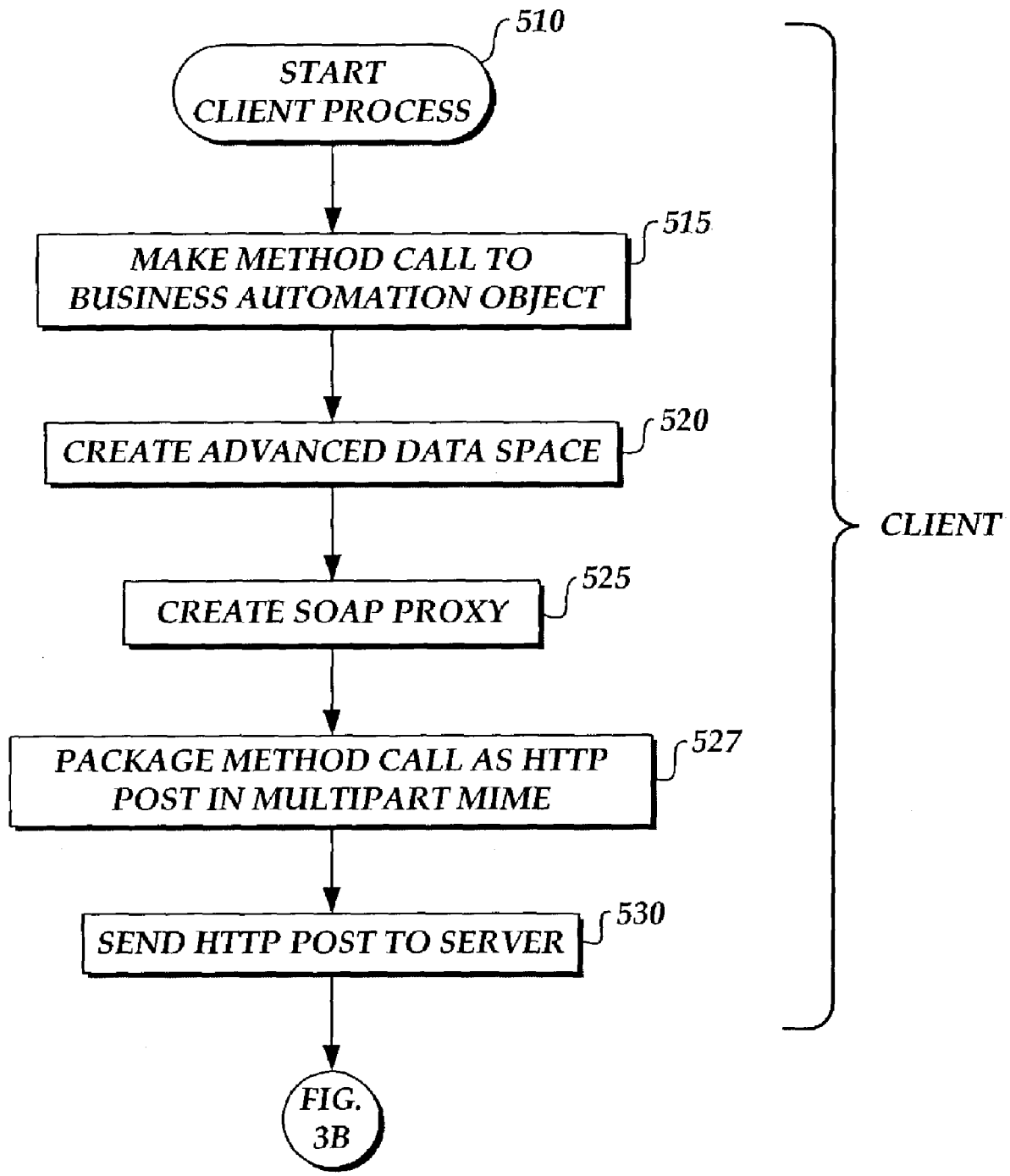
FIG. 3 is a flowchart depicting a method of marshaling data across the Internet according to the present invention.
Figure 3B:
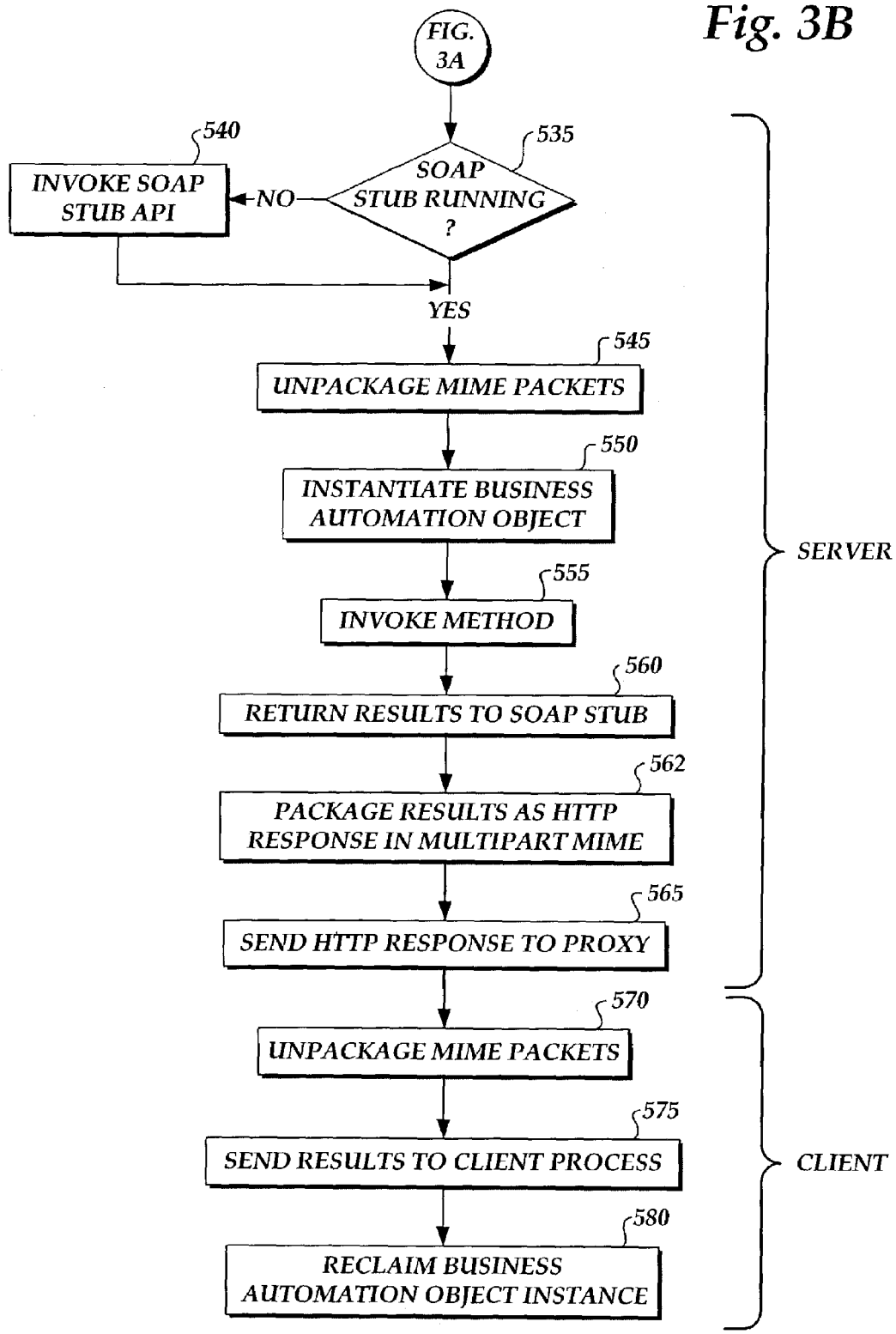
Figure 4:
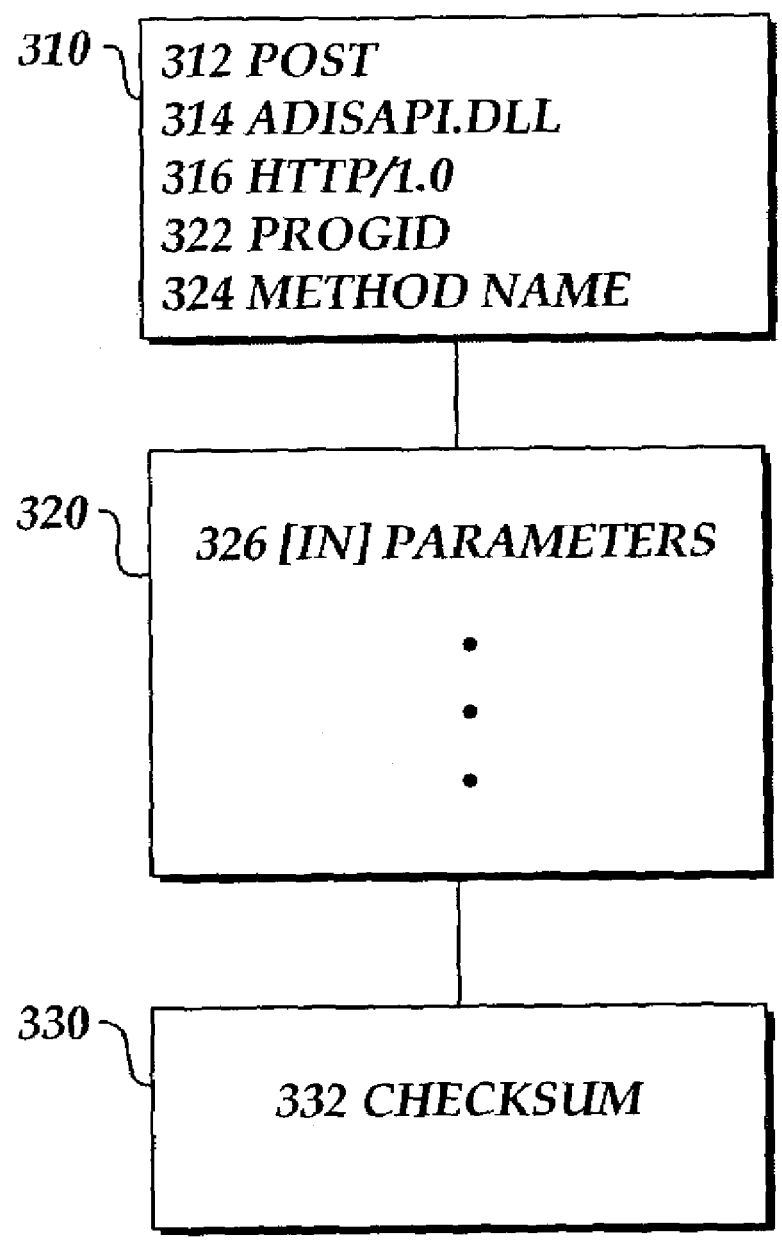
FIG. 4 is a block diagram depicting a data structure for a request message according to an embodiment of the present invention.
Figure 5:
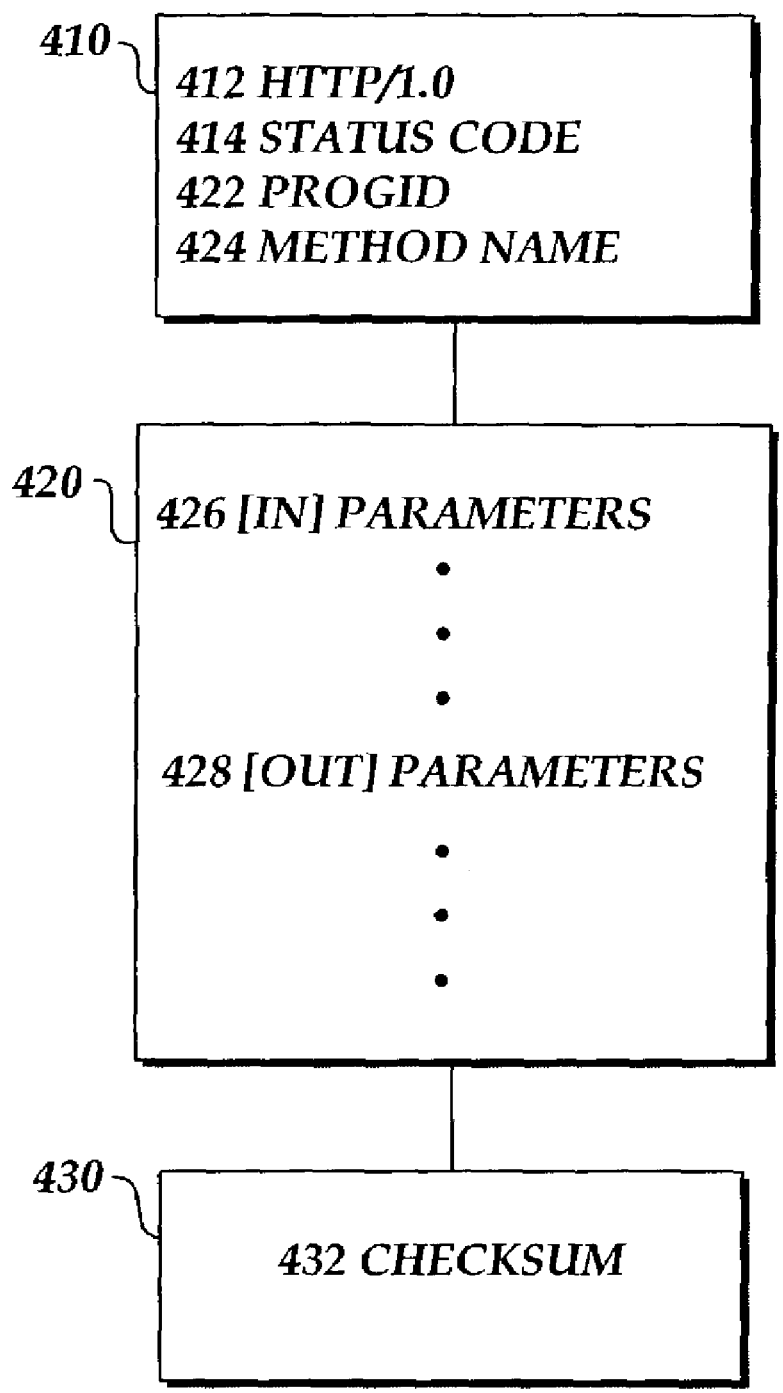
FIG. 5 is a block diagram depicting a data structure for a response message according to an embodiment of the present invention.

FIG. 3 is a functional flow diagram illustrating in more detail the operation of the invention. FIGS. 4 and 5 depict the data structure in more detail. FIG. 4 depicts the data structure from the client computer 10 toward the server computer 30 and FIG. 5 depicts the data structure from the server computer 30 toward the client computer 10.

Referring to FIG. 3, blocks 510 to 530, and 570 to 580 represent actions performed on the client computer. Blocks 535 to 565 represent actions performed on the server computer. During the running of the client process (block 510), when the script or application 130 makes a method call (block 515), Advanced DataSpace 120 is created. See block 520. As shown in FIG. 2, this occurs within the run-time environment 100 of the client process 110. The Advanced DataSpace 120 is a client-side automation object, the sole purpose of which is to create a SOAP proxy 140 (block 525) with which the client process 110 interacts. When the SOAP proxy is created, the Advanced DataSpace tells the SOAP proxy the name of the server computer 30 that it is targeting as well as the name, or progid, of the Automation object 180 that is to be instantiated on the server.

After the SOAP proxy 140 is created, a method call from the client process 110 is made on the SOAP proxy 140, which converts the method call into an HTTP POST message. See block 527. The HTTP POST message is shown in FIG. 4. The HTTP POST message has the previously described three-section data structure, i.e., the HTTP POST message comprises a header 310, a body 320 and a trailer 330. The header 310 includes fields for holding data representing a "POST" instruction 312, the name of an API for processing the message 314, an indicator of the version of HTTP being used, 316 the progid 322 of the Automation object to be instantiated, and a method name 324 that identifies the object method to be invoked.

In an exemplary embodiment of the present invention, the HTTP version information is used by the client computer 10 to indicate to the server computer 30 the highest permissible version of HTTP that can be used to format response messages produced by the server computer 30. While HTTP versions 1.0 and 1.1 are presently contemplated for use in actual embodiments of the invention, those skilled in the art will readily appreciate that any other versions of HTTP, as well as various versions of other Internet protocols may be used without departing from the spirit and scope of the invention.

The header 310 of the HTTP POST message also includes fields for holding data representing the PROGRAM ID (progid) 322 of the COM Automation object to be instantiated, a method name 324 that identifies the object method to be invoked following the progid 22, and any [in] parameters 326 that are needed by the method. The progid is an alphanumeric representation of the unique GUID used to identify the Automation class to instantiate on the target machine. The progid is used to obviate the need for application developers to encode long (128 bit) numeric sequences to identify Automation objects. This concept of progids is a part of the COM Automation model defined by Microsoft Corporation. The body of the HTTP POST message includes a MIME-encoding of the [in] parameters to be passed to the instantiated Automation object. Trailer 330 of the HTTP POST message preferably includes a field for holding data representing a checksum 332 for error-checking and correction purposes.

Returning to FIG. 3, the SOAP proxy 140 takes the HTTP POST message, and packages it as multipart MIME packets (block 527), which are sent, as a binary data stream, across the Internet 20, through a firewall 150, to the Web server 160. See block 530. Since the method call is encoded in HTTP, it passes through the firewall 150 without difficulty.

An example of a suitable Web server 160 is the Internet Information Server (IIS), from Microsoft Corporation, of Redmond, Wash. A suitable API is the Internet Services Applications Programming Interface (ISAPI) Dynamic Link Library (DLL), an example of which is the Advanced Data ISAPI (ADISAPI) component, from Microsoft Corporation, of Redmond, Wash. The API forms the server side stub for the SOAP proxy 140, i.e., the API acts as the SOAP stub 170. Thus, the SOAP stub 170 is a server-side Applications Programming Interface (API) that interacts with the SOAP proxy 140. Those skilled in the art will recognize that the Web server 160 and SOAP stub 170 may be implemented using programs other than IIS and ADISAPI, respectively, without departing from the spirit and scope of the invention.

Returning to FIG. 3, upon receiving the multipart MIME encoded HTTP POST message, a test is made to determine if the SOAP stub 170 is running on the Web server. See block 535. If the SOAP stub is not running, the Web server 160 invokes the API named in the multipart MIME encoded HTTP POST message to act as the SOAP stub 170. See block 540. The SOAP stub 170 implements an HTTP parser that unpackages the multipart MIME packets into individual parameters for the method call. See block 545.

At block 550, the Automation object 180 is instantiated by the SOAP stub 170, and the method call is made on the instantiated Automation object 180. For simplicity, any discussion of "Automation object" refers to the instance of the COM Automation object executing on the Web server 160, rather than the program code merely stored on a disk or in memory.

Next, at block 555, the Automation object 180 invokes the called method using the [in] parameters provided by the SOAP proxy 140, and returns the results, or [out] parameters, to the SOAP stub 170. See block 560. The SOAP stub 170 repackages the data as an HTTP response message in multipart MIME packets. See block 562.

Those skilled in the art will appreciate that the Automation object 180 and associated method may be used for performing a variety of functions. For instance, the method could be used to access and retrieve data from a database 190 connected to the server computer, or the method could be used to insert data into the database 190, or both, by first retrieving data records from the database 190, updating the data records and then replacing the old database records with updated data records.

The HTTP Response message is shown in FIG. 5. As previously described, the HTTP Response message is a three part structure that comprises a header 410, a body 420, and a trailer 430. The header 410 includes fields for holding data representing the version of HTTP being used 412, a status code 414, the progid 422 of the Automation object that was accessed, and the method name 424 of the object method that was invoked. The body 420 includes fields for holding data representing the [in] parameters 426 used by the method, and any [out], or return, parameters 428 returned by the method, i.e., the body includes the parameters marshaled across within the MIME stream—the "values" or state of the elements to be processed by the target Automation object. The trailer 430 of the HTTP Response message preferably includes a field for holding data representing a checksum 432 that is used by the client computer for error-checking and correction purposes.

Returning to FIG. 3, the web server 160 transmits the multipart MIME packets back to the client computer 10 via the Internet 20. See block 565. The SOAP proxy 140 unpackages the MIME packets. See block 570. At block 575, the SOAP proxy returns the [out] parameters to the client process 110, which performs further processing, as required. Thereafter, at block 580, the instance of the Automation object 180 is reclaimed; however as will be recognized by those skilled in the art, reclamation may occur at any time after the method has completed execution.

As will be readily appreciated by those skilled in the art, the present invention solves problems associated with passing distributed component software through a firewall. More specifically, the invention provides a way of allowing richer, interactive Web content to pass through firewalls. This is accomplished by an application layer protocol that allows remote Automation objects to be accessed using existing protocols which can pass through firewalls.

While the preferred embodiment of the invention has been illustrated and described, it will be appreciated that within the scope of appended claims various changes can be made therein without departing from the spirit of the invention.

The embodiments of the invention in which an exclusive property or privilege is claimed are defined as follows:

1. A computer-readable medium having computer-executable code for marshaling data between a client computer and a server computer through a global communication network, such as the Internet, wherein the marshaled data is associated with a method of an object to be invoked on the server computer, the computer-executable code comprising:

code for packaging a data structure, the data structure including: (i) a header section comprising a first header data field containing data representing a name of an object to be instantiated and a method associated with the object to be invoked on the server computer, wherein the header section of the data structure further includes a second header data field containing data representing an HTTP POST message request, and a third header data field containing data representing a name of an Applications Programming Interface (API) for unpackaging the HTTP POST message; and (ii) a body section comprising at least one first body data field containing data representing input parameters used by invoking the method associated with the object to be instantiated.

2. The computer-readable medium of claim 1 wherein the header section of the data structure further includes a fourth header data field containing data representing an HTTP version identifier.

3. The computer-readable medium of claim 2, wherein:
the header section of the data structure further includes a fifth header data field containing data representing a status code; and
wherein the body section of the data structure further includes at least one second body data field containing data representing return parameters obtained from the invoked method associated with the instantiated object on the server computer.

* * * * *